2,733,930

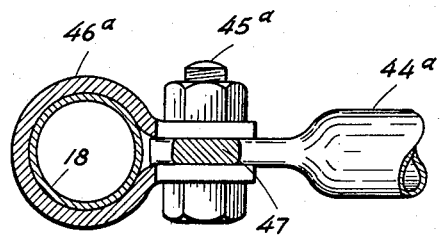
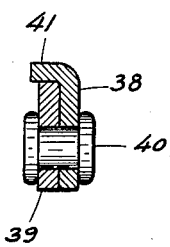
Fig. 10   Fig. 9
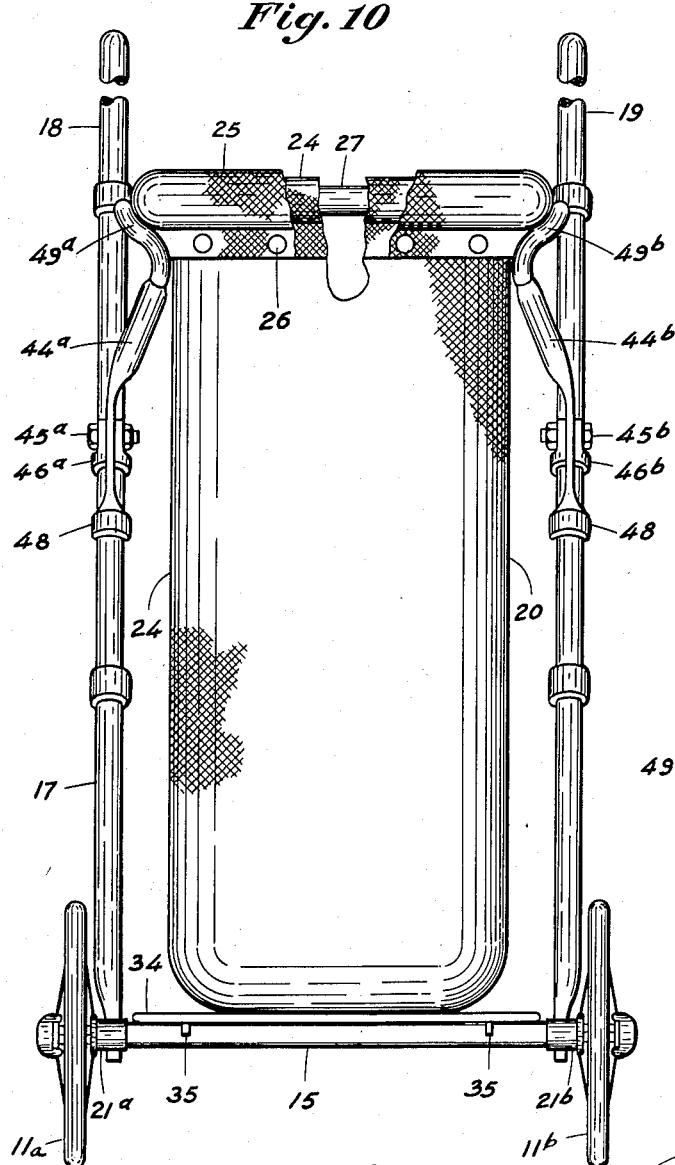
Fig. 2
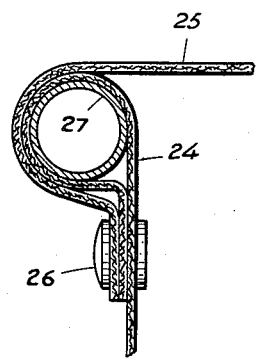
Fig. 7
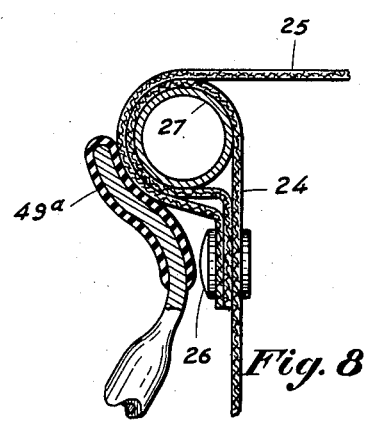
Fig. 8
Lucy Putterman
INVENTOR.
BY
ATTORNEY Feb. 7, 1956　　　　　L. PUTTERMAN　　　　　2,733,930
COLLAPSIBLE UTILITY CART WITH REMOVABLE CONTAINER
Filed Oct. 3, 1952　　　　　　　　　　　　3 Sheets-Sheet 3
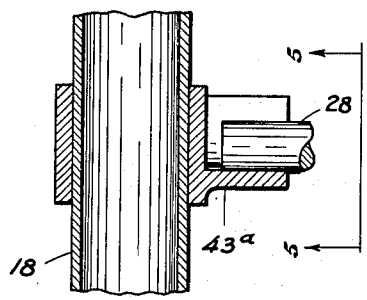
Fig. 4
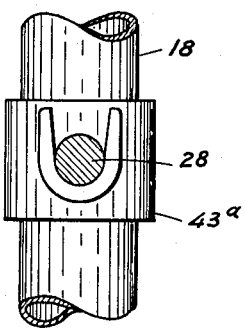
Fig. 5
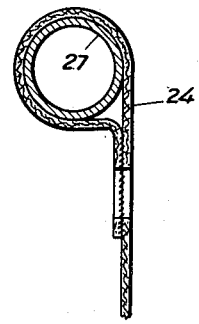
Fig. 6
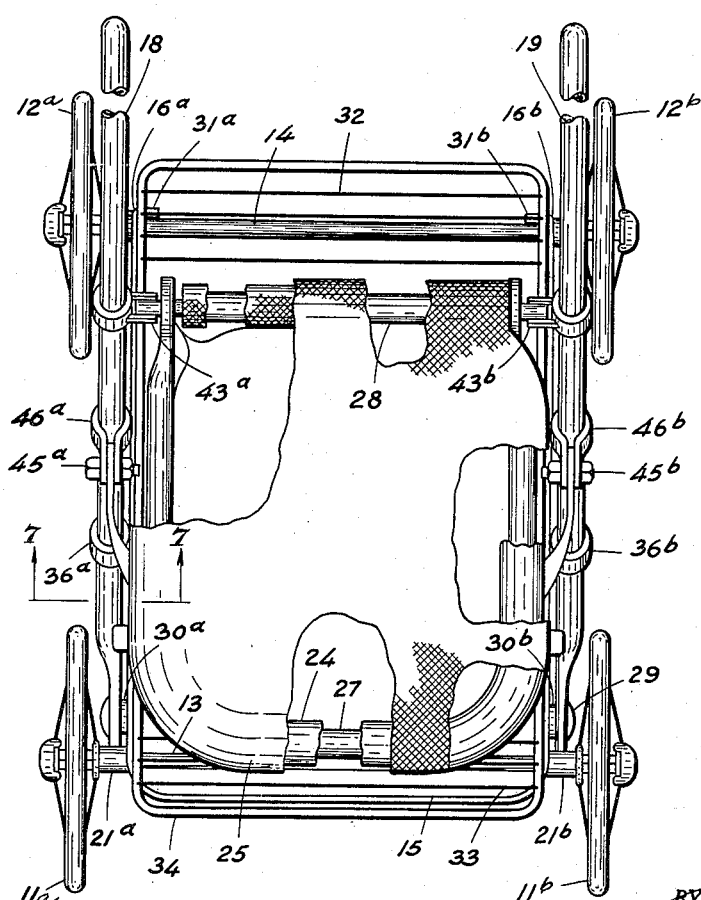
Fig. 3
LUCY PUTTERMAN
INVENTOR.
ATTORNEY

United States Patent Office 2,733,930
Patented Feb. 7, 1956

COLLAPSIBLE UTILITY CART WITH REMOVABLE CONTAINER

Lucy Putterman, Forest Hills, N. Y.

Application October 3, 1952, Serial No. 312,991

7 Claims. (Cl. 280—41)

My present invention relates to utility carts of the type adapted to be wheeled by housewives or other users for shopping purposes and the like, wherein a bag or similar container is removably held in a frame comprising a wheel-supported undercarriage and a handlebar attached to said undercarriage.

Utility carts of this general description, more particularly those which for greater capacity and stability are provided with more than two wheels, are usually of relatively bulky construction and for this reason occupy considerable storage space when not in use. Carts having two wheels only are, moreover, difficult to transport over steps and stairs even when in empty or partly filled condition.

The primary object of my invention is to provide a cart, which is fitted with four wheels, so that it can be readily moved up on curbs and other elevated locations, the cart being fitted with a bag which is completely covered and can be readily removed from the cart without special equipment.

It is, accordingly, an important object of my invention to provide a collapsible three or four-wheel cart of the character described adapted, for purposes of storage, to assume a collapsed position in which the space occupied by it is less or not substantially greater than that occupied by a comparable two-wheel cart of considerably smaller capacity.

It is also an object of the present invention to provide, in a utility cart having a front wheel assembly and a rear wheel assembly, mechanism for so raising one of these wheel assemblies with respect to the other that transportation of the cart over steps or stairs will be considerably facilitated.

Another feature of my invention resides in the fact that it is light, of rigid construction, and can be produced at relatively low cost.

A further object is to provide a carrier cart, which can be produced in a wide range of sizes, and can be utilized for a wide variety of purposes and applications.

Another object of this invention is to provide a four-wheel utility cart of sturdy construction and capable of supporting a bag or container of large capacity, yet adapted upon removal of said bag or container to be collapsed into a position of minimum volume in which the members of its frame structure are at least substantially aligned in a single plane.

The accompanying drawings, illustrative of one embodiment of my invention together with the description of its construction and the method of operation and utilization thereof, will serve to clarify further objects and advantages of my invention.

In the drawings:

Fig. 2 is a front elevation of the assembled carrier cart shown in Fig. 1, with the bag in place, a portion of the upper section of the bag being broken away to show the bag support bracket.

Fig. 3 is a plan view of the cart shown in Figs. 1 and 2, with a portion of the bag cover broken away to show the bag construction, and bag supporting structure.

Fig. 4 is a section through one of the tubular handle support members and the cross-bar support bracket, taken at 4—4, Fig. 1.

Fig. 5 is a cross-section through the bag support cross-bar and a side elevation of the cross-bar support bracket shown in Figs. 1 and 4, taken at 5—5, Fig. 4.

Fig. 6 is a cross-section through the open top of the bag and the bag support bracket, shown in Figs. 1 and 2, taken at 6—6, Fig. 1.

Fig. 7 is a cross-section through one side of the top of the bag, the bag support bracket and the bag cover, shown in Figs. 1, 2 and 3, taken at 7—7, Fig. 3.

Fig. 8 is a vertical section through one side of the top of the bag, the bag support bracket and the pivoted bag support bracket brace, taken at 8—8, Fig. 1.

Fig. 9 is a cross-section through the pivoted joint of the links connecting the tubular handle support members and the undercarriage frame shown, in Fig. 1, taken at 9—9, Fig. 1.

Fig. 10 is a cross-section through the tubular vertical handle support member, and the clip pivotally supporting the bag support bracket brace, taken at 10—10, Fig. 1.

Figure 1:
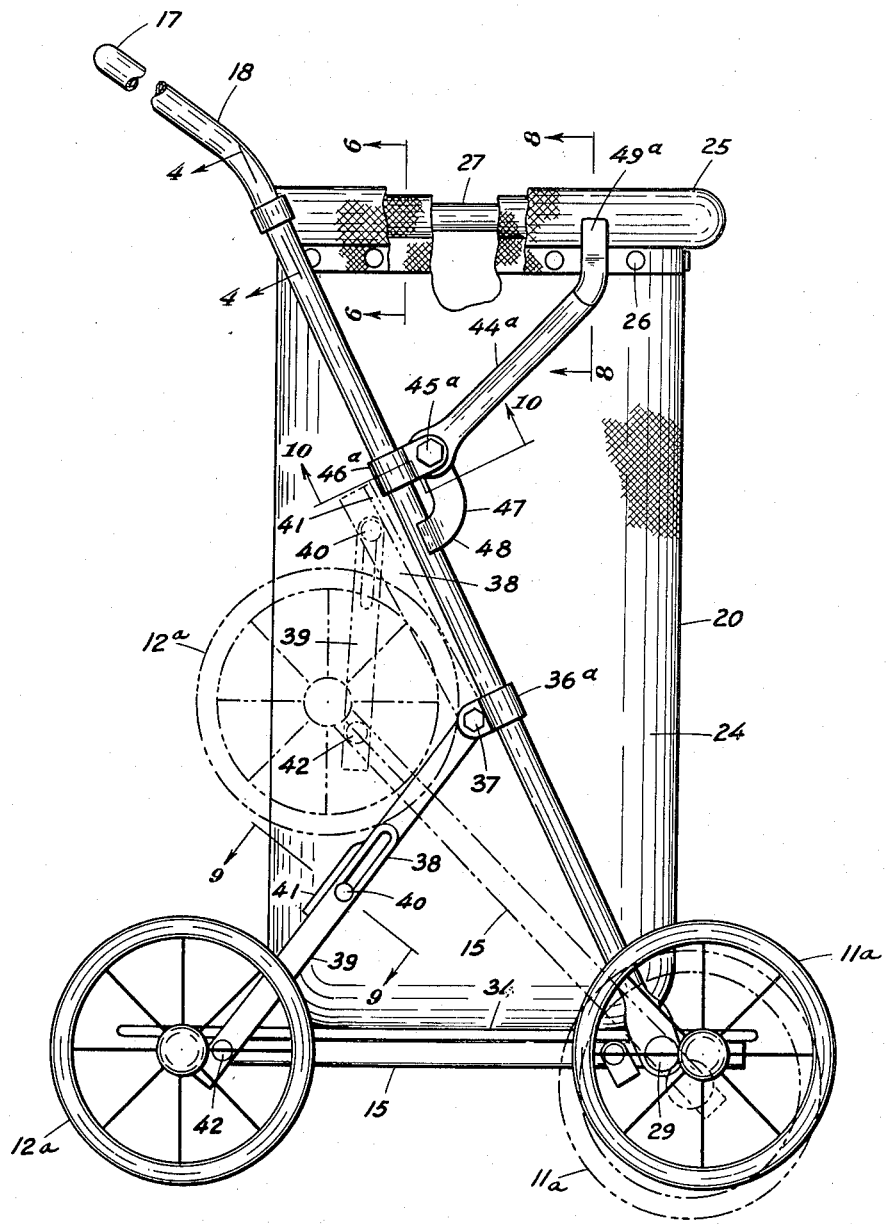
Fig. 1 is a side elevation of the assembled carrier cart, with the bag in place, also showing the wheels and the carriage frame folded against the tubular vertical handle support members, in dot-dash lines.

It will be understood that the following description of the construction and the method of utilization and operation of the "collapsible utility cart," is intended as explanatory of the invention and not restrictive thereof.

In the drawings, the same reference numerals designate the same parts throughout the various views, except where otherwise indicated.

One embodiment of the construction shown in Figs. 1 and 2, comprises an undercarriage or carriage, resting on a pair of front wheels 11a and 11b and a pair of rear wheels 12a and 12b, mounted on individual axles 13 and 14, which support a carriage base member 15 of substantially rectangular form the side arms 16a and 16b of which are attached to the axles, with a handle frame 17 having a pair of frame side members 18 and 19, the lower ends of which are pivotally attached to the side members of the undercarriage frame, and a container generally designated 20, which is removably supported by handle support members.

A pair of collars 21a and 21b may be mounted on each of the axles 13 and 14 to locate the wheels, relative to the carriage base side members.

The container 20 consists of a bag 24 of substantially rectangular cross-section, a cover 25 detachably secured to the bag 24 by means of snap fasteners 26, and a tubular, U-shaped bracket 27, whose arms are traversed at their ends by a cross bar 28 and to which the top of the bag 24 is attached, as best seen in Figs. 6–8.

The upper end of the container which is made of a heavy fabric such as canvas, a plastic material, or other suitable material, may be wrapped around and sewn or otherwise attached to the arms of the U-shaped tubular bracket 27, in the manner shown in section in Fig. 6. The cover, the rear portion of which is sewn or otherwise attached to the cross bar, 28 is fitted around the open top of the bag, and follows the contour thereof, the edges of the cover being attached to the bag by a plurality of snap fasteners 26, or other suitable attaching means.

The handle frame 17 comprises a pair of tubular support members 18 and 19 which pass diagonally from the upper rear edge to the lower front edge of the container 20, the lower ends of these support members being flattened and traversed by the reduced ends of a rod 29 forming a pivotal axis for said handle frame side members. The ends of rod 29 also pass through opposite arms of a U-shaped base member 15, which is also pivotable about this rod and which is traversed by a front wheel axel 13, parallel to rod 29 and located a short distance forwardly thereof, and by a rear wheel axle 14, likewise parallel to rod 29 and located a considerable distance to the rear thereof. The wheels 11a, 11b and 12a, 12b, are mounted on the ends of the front axle 13 and the rear axle 14, respectively. The base member 15 whose parallel side members 16a and 16b terminate in short, inturned extensions 31a, 31b at the rear of the cart, supports a removable tray 34, which may be provided with suitable means, such as depending lugs 35, for properly maintaining its alignment with the base member 15.

The extensions 31a and 31b, formed at the rear end of the base frame 15, may be attached to the rear axle by pins, screws or other suitable means to locate the frame laterally relative to the wheels.

The tray 34 has a plurality of cross-members 32 and 33 attached to the sides thereof, the cross-members being spaced along the tray, in the manner indicated in Fig. 3, to assist in supporting the bottom of the container bag, which rests thereon.

The cross-members may be made of rods of cylindrical form, or wire, the ends being fitted into slots formed in the side bars of the tray or mounted on the upper edge of the side bars, and welded or otherwise attached thereto.

The base member 15 is normally held rigid with respect to the handle frame side members 18 and 19, by means of a bracing mechanism which comprises a collar 36a, 36b on each of these handle side members, positioned less than half-way up from the pivot 29 thereof, a pivot screw 37 on each of these collars, and a pair of links 38, 39, hinged together at 40, on each side of the cart, only those associated with the right-hand handle support member 18 being visible in the drawing. As indicated in Fig. 3, both ends of the rod 29 may be riveted over the side arms 16a and 16b of the base member, a spacer 30a, or 30b being inserted on the rod 29, between the base side arm and the lower flattened end of the corresponding frame side member 18 or 19 to accurately space the handle frame members from the base side arms. Link 38 has its extremities attached to the pivot screw 37 and to the hinge pin 40, respectively, and is provided with a shelf portion 41, which (as best seen in Fig. 9) overlies the link 39 and prevents the latter from rotating clockwise (as viewed in Fig. 1) about the pin 40 past a position of relative alignment of the two links; link 39, whose upper end is normally in engagement with the shelf portion 41 and is attached to the hinge pin 40, has its lower end pivotally connected to the side arm 16a of the base member 15 by means of a stud 42 projecting from each of said arms just forwardly of the rear wheel axle 14. Thus the linkage 38, 39 is adapted to be buckled at 40 to assume a position, shown in dot-dash lines in Fig. 1, in which the base member 15 occupies a position almost parallel and coplanar with the handle frame side members 18 and 19, having swung clockwise about its pivot rod 29. As indicated in Fig. 1, the lower link 39, has a slot cut therethrough to allow the pivot pin 40 to slide upward along the slot when the link is moved from the extended position, Fig. 1, to the folded position, shown in dot-dash lines, Fig. 1.

The container 20 whose lower end rests on the tray 34, is supported at the top with the aid of trough-shaped brackets 43a, 43b, secured, respectively, to the handle side members 18 and 19 and adapted to receive the cross-bar 28, as best seen in Figs. 4 and 5. Auxiliary supporting means for the front portion of the bracket 27 are provided in the form of two swingable braces 44a, 44b, each connected to the handle frame members 18 and 19, respectively, by means of a pivot screw 45a, 45b held in a collar 46a, 46b which surrounds the respective handle frame side member. Each of these braces is provided with a depending spur 47 (only one shown) whose bifurcate end straddles the corresponding handle bar and prevents further clockwise rotation of the brace (as viewed in Fig. 1) when the latter has reached a position in which its upper extremity extends substantially vertically upwardly; this upper extremity, which is sheathed in a rubber sleeve 49a, 49b, is curved outwardly and forms a bearing for the bracket 27, with portions of bag 24 and the cover 25 wrapped therearound, when the brace is in its stable, extreme position in which its spur 47 bears upon the handle side member as shown in Fig. 1. Each of the spurs 47 attached to or integral with the lower end of the corresponding brace 44a, 44b, has a U-shaped bifurcate end 48 integral therewith, the bifurcated end engaging the outer surface of the handle frame member to retain the container support bracket 27 in a horizontal position.

The rubber sheath 49a, 49b, may be a separate hollow rubber sleeve fitted over the upper end of the brace 44a, 44b, on it may be cemented or otherwise attached to the upper end of each of the braces, to protect the bag 24 and the cover 25 from abrasion.

The two brackets 43a and 43b shown in Figs. 4 and 5 have a tubular member fitted over and attached to the corresponding handle frame side member 18 or 19, the trough shaped slots receiving the ends of the cross-bar 28 which supports the container bracket 27. The two slots, which are angularly positioned, relative to the bag axis, retain the bag in place and permit its ready removal by removing the cross-bar with the container bracket attached thereto, from the slots in the brackets 43a and 43b.

From the foregoing description and from the drawing it will have become apparent that normally, that is to say, when the cart according to my invention is in use or is ready for use, the members 38, 39, 44a, 44b will occupy the positions shown in solid lines in Figs. 1–3 and will form a rigid structure adapted to support the container 20 in the position shown, with the handle frame side members 18 and 19 extending upwardly and rearwardly at an angle of, say 60–75° with respect to the horizontal base member 15. The cart may then be wheeled in the usual manner or left standing without external support; the container 20 may be lifted bodily from the cart, or the bag 24 thereof rendered accessible by partial or total removal of its cover 25, without interfering with the mechanism 37—42 which braces the cart against collapse.

When it is desired to move the cart over steps or stairs without prior removal of the bag 24, then the linkage 38, 39 may be buckled to assume a position intermediate those shown in Fig. 1 in solid and in dot-dash lines, whereby the rear wheel assembly 12a, 12b and 14 will be raised and the front wheel assembly 11a, 11b and 13 will be slightly lowered with respect to the pivotal axis 29; this will greatly facilitate upward or downward transportation of the cart. When, on the other hand, the cart is to be stored away in a limited space, the container 20, and the tray 34 are removed or left attached to the base member and the members 15, 38, 39 are caused to assume the position shown in dot-dash lines, in which the frame structure of the cart is collapsed to an almost planar state so that its volume will be a minimum, the braces 44a, 44b having been swung counter-clockwise (as viewed in Fig. 1) into a retracted position adjacent the handle side members. In moving the links 38, 39 from the rigid position shown in Fig. 1, to the collapsed position shown in dot-dash lines, Fig. 1, the central pivot 40 moves along the slot cut through the lower link 39, thereby allowing the links to move into the folded position.

The unit may be produced in a wide range of sizes and types to suit particular operating conditions.

The container may be of the cross-section shown in the drawings, or it may be varied in cross-section to suit particular capacities and operating conditions.

The cross-bar supporting the rear end of the container support bracket, and the method of supporting it on the handle frame members may be altered considerably.

It will be apparent to one skilled in the art that applicant's principles may be applied in many modified forms and therefore the following claims should not be limited to the forms illustrated but be deemed to apply to all equivalents as well.

What is claimed is:

1. A utility cart comprising a pair of elongated handle members, pivot means on said handle members, a base member swingably attached to said handle members with the aid of said pivot means, a front wheel assembly on said base member comprising an axle located forwardly of said pivot means, a rear wheel assembly on said base member comprising an axle located rearwardly of said pivot means, bracing means selectively operable to maintain said base member rigid with respect to said handle members at a relatively large angle thereto and to enable swinging of said base member toward a position of substantial alignment with said handle members, a bracket attached to each of said handle members, a cross-bar located between said handle members removably supported by said handle member brackets, a tubular U-shaped container support bracket fitted between the handle members pivotally supported by the cross-bar, and swingable braces attached to the handle members operative to receive the front portion of the tubular container support bracket when the swingable braces are located in an angular position relative to the handle members, means integral with the swingable braces engaging the handle members to retain the swingable braces in the operative position, said swingable braces being retractable into a position substantially parallel to and adjacent said handle members.

2. A utility cart comprising a base member, a pair of elongated handle members, pivot means swingably connecting said base member to said handle members, a first link member pivotally secured to said handle members, a second link member pivotally secured to said base member, hinge means pivotally interconnecting said link members, abutment means on one of said link members so engaging the other of said link members in an aligned position thereof as to prevent unidirectional relative movement of said link members past said aligned position, said link members when thus aligned maintaining said base member rigid with respect to said handle members at a relatively large angle thereto, said link members being adapted to be disaligned in a manner causing relative rotation of said handle members and of said base member toward a position of substantial relative alignment thereof, a bracket attached to each of said handle members, a cross-bar located between said handle members removably supported by said handle member brackets, a tubular U-shaped container support bracket fitted between the handle members pivotally supported by the cross-bar, and swingable braces attached to the handle members operative to receive the front portion of the tubular container support bracket when the swingable braces are located in an angular position relative to the handle members, means integral with the swingable braces engaging the handle members to retain the swingable braces in the operative position, said swingable braces being retractable into a position substantially parallel to and adjacent said handle members.

3. A utility cart comprising an undercarriage, a front wheel assembly and a rear wheel assembly on said undercarriage, a pair of handle members rising from said undercarriage and swingably connected thereto intermediate said wheel assemblies, collapsible bracing means connected to said undercarriage and to said handle members, said bracing means being positionable to maintain said handle members rigid with respect to said undercarriage and at a steep angle thereto, a bracket attached to each of said handle members, a cross-bar located between said handle members removably supported by said handle member brackets, a tubular U-shaped container support bracket fitted between the handle members pivotally supported by the cross-bar, and swingable braces attached to the handle members operative to receive the front portion of the tubular container support bracket when the swingable braces are located in an angular position relative to the handle members, means integral with the swingable braces engaging the handle members to retain the swingable braces in the operative position, said swingable braces being adapted to be retracted into a position substantially parallel to and adjacent said handle members.

4. A utility cart comprising an undercarriage, a front wheel assembly and a rear wheel assembly on said undercarriage, a pair of handle members rising from said undercarriage and swingably connected thereto near the front thereof, collapsible bracing means connected to said undercarriage near the rear thereof and to said handle members, said bracing means being positionable to maintain said handle members rigid with respect to said undercarriage in rearwardly tilted position, a container located between said handle members, said container comprising a bag open at the top and a bracket secured to said bag near said top, fixed support means on said handle members operative to removably receive the rear portion of said bracket, and swingable support means on said handle members operative to removably receive the front portion of said bracket in an operative position of said swingable support means and to be retracted into a position substantially parallel with and adjacent said handle members upon removal of said container.

5. A utility cart comprising an undercarriage, a front wheel assembly and a rear wheel assembly on said undercarriage, a pair of handle members rising from said undercarriage and swingably connected thereto near said front wheel assembly between the latter and said rear wheel assembly, collapsible bracing means connected to said undercarriage near said rear wheel assembly and to said handle members, said bracing means being positionable to maintain said handle members rigid with respect to said undercarriage in a rearwardly tilted position, a container located on said undercarriage between said handle members, said container comprising a bag open at the top and a bracket secured to said bag near said top, fixed support means on said handle members operative to removably receive the rear portion of said bracket, and swingable support means on said handle members operative to receive the front portion of said bracket in an operative position of said swingable support means and to be retracted into a position substantially parallel with and adjacent said handle members upon removal of said container.

6. A utility cart comprising an undercarriage, said undercarriage including a base member and a tray removably resting on said base member, a front axle on said base member having a pair of front wheels secured thereto, a rear axle on said base member having a pair of rear wheels secured thereto, a pair of handle members rising from said undercarriage and swingably connected to said base member near said front axle between the latter and said rear axle, collapsible bracing means connected to said base member near said rear axle and to said handle members, said bracing means being positionable to maintain said handle members rigid with respect to said base member in rearwardly tilted position, a container supported by said tray intermediate said handle members, said container comprising a bag open at the top, a bracket embraced by a top portion of said bag fixed support means on said handle members operative to removably receive the rear portion of said bracket, and swingable support means on said handle members operative to removably receive the front portion of said bracket in an operative position of said swingable support means and to be retracted into a position substantially parallel with and adjacent said handle members upon removal of said container.

7. A utility cart comprising an undercarriage, said undercarriage including a base member and a tray removably resting on said base member, a front wheel assembly and a rear wheel assembly attached to said undercarriage, a pair of handle support members rising from said base member, means pivotally connecting said handle support members to the base member, a first link member pivotally secured to each of said handle support members, a pair of link members pivotally secured to the base member, hinge means pivotally connecting each set of link members, abutment means on one of the link members so engaging the other of said link members in an aligned position thereof as to prevent unidirectional relative movement of said link members past the aligned position, said link members when thus aligned maintaining the base member rigid with said handle support members at a relatively large angle thereto, a container positioned on the tray mounted on the base member intermediate the handle support members, said container comprising a bag open at the top, a tubular bracket embraced by a top portion of said bag and a removable cover for said bag fastened around said bracket, a cross-bar pivotally supporting the rear portion of said bracket, a pair of fixed brackets attached to the handle support members, said brackets removably supporting the cross-bar, and swingable braces attached to said handle support members, operative to receive the front portion of said bracket in an operative position of said swingable braces, means integral with the swingable braces engaging the handle support members to retain the swingable braces in the operative position.

References Cited in the file of this patent

UNITED STATES PATENTS

| | | |
|---|---|---|
| 863,274 | Haffey | Aug. 13, 1907 |
| 1,576,075 | Tisdell | Mar. 9, 1926 |
| 2,616,718 | Heideman | Nov. 4, 1952 |